UNITED STATES PATENT OFFICE.

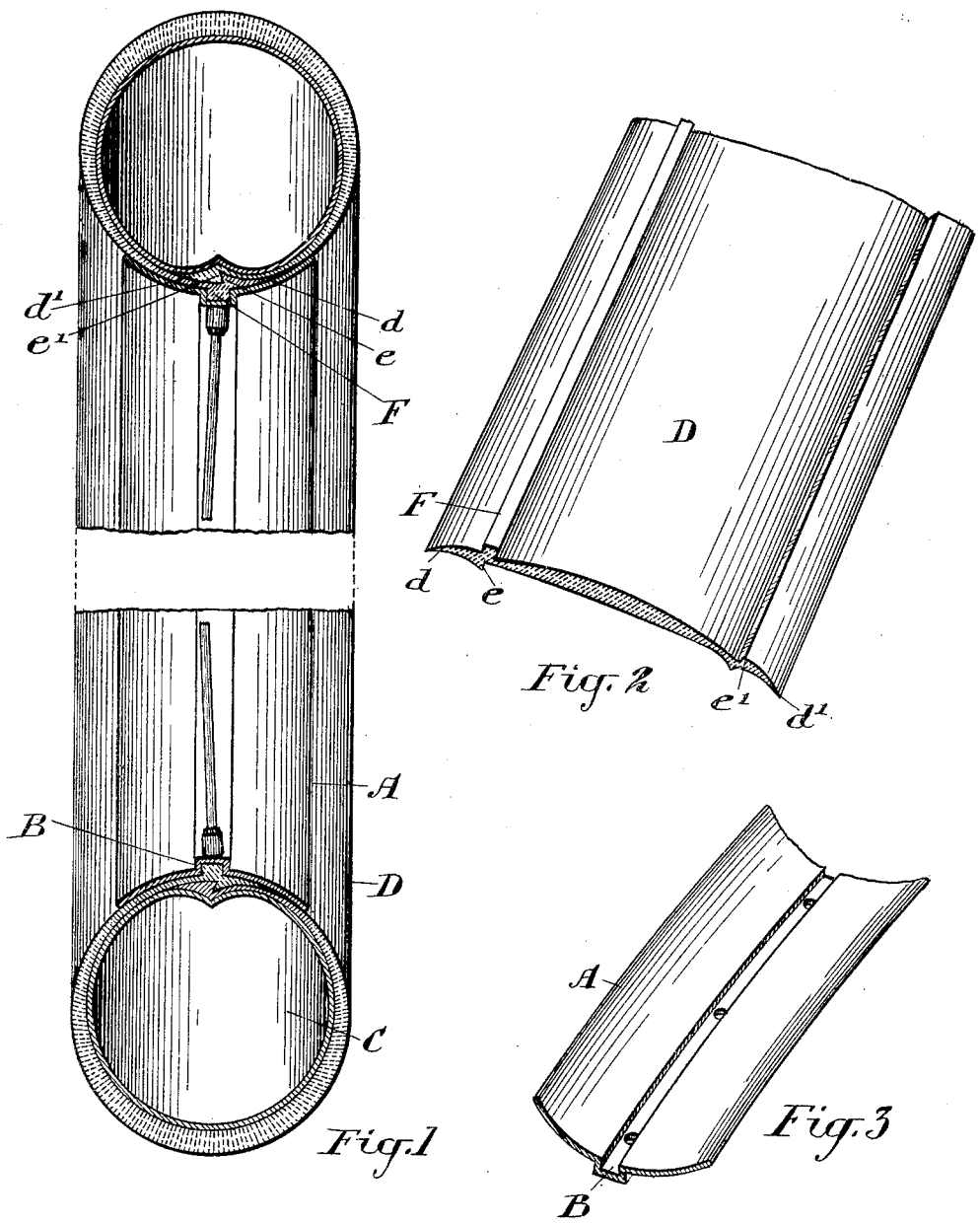

WILLIAM A. D. GRAHAM, OF OWEN SOUND, CANADA, ASSIGNOR OF ONE-HALF TO ARTHUR PRATT JAMESON, OF SOUTH DUMFRIES, CANADA.

BICYCLE-TIRE.

SPECIFICATION forming part of Letters Patent No. 595,300, dated December 14, 1897.

Application filed February 5, 1894. Serial No. 499,219. (No model.) Patented in England February 28, 1894, No. 4,245.

*To all whom it may concern:*

Be it known that I, WILLIAM A. D. GRAHAM, student, of Owen Sound, in the county of Grey and Province of Ontario, Canada, have invented certain new and useful Improvements in Bicycle-Tires, (for which English Patent No. 4,245, dated February 28, 1894, has been granted me;) and I hereby declare that the following is a full, clear, and exact description of the same.

The object of this invention is to devise a pneumatic tire for cycles of all descriptions, which will be comprised of an air-tube and an outer covering inclosing the air-tube, and to provide the adjacent meeting edges of the outer covering with an interlocking device by means of which the said meeting edges can be locked together to form a complete covering for the air-tube and to provide that part of the outer covering which will be adjacent to the rim with a bead or flange adapted to enter a channel formed in the middle part of the rim, the whole device being constructed and arranged as hereinafter set forth, and more particularly pointed out in the claim.

In the drawings, Figure 1 is a sectional view of the device. Fig. 2 is a view of a section of the outer covering. Fig. 3 is a perspective view of a section of the rim.

Like letters of reference refer to like parts throughout the specification and drawings.

The invention consists of a rim A, having a concaved seat for the tire and a continuous channel B, formed in the middle of the rim. The tire consists of an air-tube C, of any ordinary formation or style, inclosed by an outer covering D. Each of the adjacent meeting edges $d\ d'$ of the outer covering D is provided with a locking member $e\ e'$, respectively arranged on the opposite sides of the outer covering in order that when the said covering is wrapped around the air-tube into the position indicated in Fig. 1 the said members $e\ e'$ will interlock and hold together the said adjacent meeting edges. The adjacent meeting edge $d$ of the outer covering D, which is intended to be contiguous the rim A, is provided with a bead or flange F, adapted to enter the channel B in the rim A and prevent the tire being displaced sidewise from the said rim when the tire is partially or totally disinflated. By means of this construction the outer covering can be secured to the rim and the air-tube securely locked within the outer covering without addition either to the weight of the wheel or cycle or to the cost of or labor involved in the manufacture of the cycle. It will be noticed by reference to the drawings that each locking member is sufficiently removed from its respective edge of the outer covering to permit the formation of a flange or strip between itself and the said edge. The strip between the locking member $e'$ and its meeting edge $d'$ is borne against the inner side of the outer covering by the pressure of the air-tube C when inflated, and the strip between the locking member $e$ and the edge $d$ is pressed against the outer side of the outer covering by the rim A. The pressure on these two strips is sufficient to hold the adjacent meeting edges against their respective parts of the outer covering and enable the locking members $e\ e'$ to securely interlock.

By referring to the views, Figs. 1 and 2, it will be observed that the outer covering D is thicker in its middle and the thickness gradually becomes less toward each edge until the members $e\ e'$ are reached, when the thickness of the cover is abruptly made greater, thus forming the members $e\ e'$, one member extending in one direction and the other member extending in the opposite direction. The thickness of both the members $e$ and $e'$ gradually becomes less until they terminate in the edges of the cover D. Thus when the members $e$ and $e'$ are interlocked the thick portions of the said members $e$ and $e'$ come in the thin parts of the cover D, and when the air is introduced in the tube C the pressure causes the members to firmly interlock and the joint proper is made in the middle of the tire and the inner edge of the member $e'$ extends into the tube C, and thus the cover D firmly grips the tube C and prevents in the latter any tendency to "creep." The extreme ends extending one on each side of the joint and each being firmly bound relieves the joint of some of the strain, and as both of the edges of the cover D diminish in thickness the cover on a section will assume a symmetrical shape which will bring the thickest part of the cover D squarely in the middle of the wheel.

Having thus fully described my invention, what I claim as new, and desire to secure by Letters Patent, is—

In a tire for cycles the combination of the wheel-rim having a recess located in the periphery thereof, the air-tube; a covering for the air-tube consisting of a strip of flexible material having on opposite sides of its edges abrupt enlargements, both said enlargements gradually becoming less in thickness and terminating in the extreme edges of the cover, said enlargements adapted to interlock with each other and in so doing adapted to cause an edge of the inner enlargement to extend into the air-tube when the same is inflated; a flange located on the outer side of the covering, said flange adapted to rest in the recess of the rim; the inner extending enlargement of the cover, the point of junction of the two enlargements, and the flange on the outer side of the cover, all being substantially in the same perpendicular line when the parts are in position and the air-tube inflated, as set forth.

Toronto, January 31, 1894.

W. A. D. GRAHAM.

In presence of—
C. H. RICHES,
DONALD C. RIDOUT.